United States Patent
Yielding

(10) Patent No.: US 9,527,423 B2
(45) Date of Patent: Dec. 27, 2016

(54) CONTAINER FOR PARTICULATE MATERIAL

(71) Applicant: Heil Trailer International, Co., Cleveland, TN (US)

(72) Inventor: Bryan Yielding, Riceville, TN (US)

(73) Assignee: Heil Trailer International, Co., Cleveland, TN (US)

( * ) Notice: Subject to any disclaimer, the term of this patent is extended or adjusted under 35 U.S.C. 154(b) by 0 days.

(21) Appl. No.: 15/008,178

(22) Filed: Jan. 27, 2016

(65) Prior Publication Data

US 2016/0144766 A1    May 26, 2016

Related U.S. Application Data

(63) Continuation of application No. 13/909,786, filed on Jun. 4, 2013, now Pat. No. 9,266,459.

(60) Provisional application No. 61/689,515, filed on Jun. 7, 2012.

(51) Int. Cl.
*B60P 1/56*     (2006.01)
*B60P 3/22*     (2006.01)
*B60P 1/60*     (2006.01)

(52) U.S. Cl.
CPC ............. *B60P 1/56* (2013.01); *B60P 3/221* (2013.01); *B60P 1/60* (2013.01); *B60P 3/2245* (2013.01)

(58) Field of Classification Search
CPC ............. B60P 1/56; B60P 1/60; B60P 3/221; B60P 3/2245
USPC ...... 298/8 H, 8 T, 8 R, 24, 27; 105/247–249; 220/1.5, 564
See application file for complete search history.

(56) References Cited

U.S. PATENT DOCUMENTS

| | | | |
|---|---|---|---|
| 3,981,539 A * | 9/1976 | Proeschl ............ | B60P 1/56 298/35 M |
| 6,059,372 A | 5/2000 | McDonald et al. | |
| 7,908,975 B2 | 3/2011 | Forbes | |
| 9,266,459 B2 * | 2/2016 | Yielding ............ | B60P 1/56 298/8 H |

* cited by examiner

*Primary Examiner* — Stephen Gordon
(74) *Attorney, Agent, or Firm* — Chambliss, Bahner & Stophel, P.C.

(57) ABSTRACT

A container for particulate materials that is adapted to be mounted on a trailer for transport on a roadway includes a plurality of hoppers, a shell that is disposed over the plurality of hoppers, and an internal U-shaped divider plate between each pair of adjacent hoppers.

18 Claims, 5 Drawing Sheets

FRONT OF TANK →

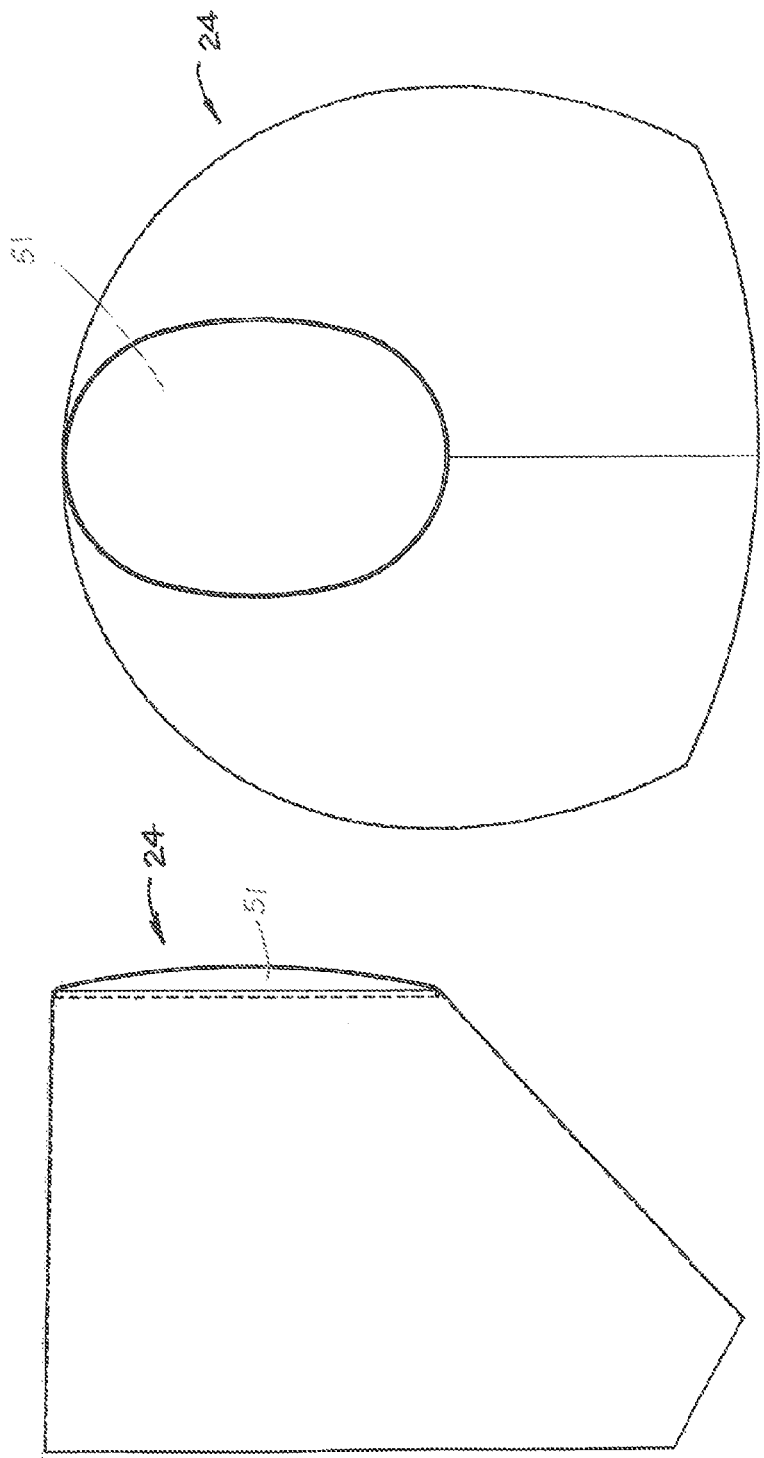

CONTAINER FOR PARTICULATE MATERIAL

CROSS-REFERENCE TO RELATED APPLICATIONS

This application is a continuation of U.S. patent application Ser. No. 13/909,786, filed Jun. 4, 2013, now U.S. Pat. No. 9,266,459, which application claims the benefit of U.S. Provisional Patent Application No. 61/689,515 which was filed on Jun. 7, 2012.

FIELD OF THE INVENTION

The present invention relates generally to containers for particulate materials, and more particularly to the type of container that is mounted on a trailer for transport.

BACKGROUND OF THE INVENTION

Many particulate materials are conveniently transported by truck, although they may also be transported by railcar, barge or by other means. Trucks that are used to transport such materials commonly include a tractor and an attached trailer having a tank or other container mounted thereon. Such trailers may also be loaded on railcars or barges, or a container may be mounted directly on a railcar or barge. Frequently, these transport containers are referred to as pneumatic containers because of the pneumatic method, involving gas- or air-entrainment, by which they may be loaded and unloaded. Particulate materials that are generally transported in pneumatic containers include agricultural products such as grain, corn kernels, beans, flour, sugar, peanuts and the like, lightweight aggregate products, and intermediate products for various industrial uses such as plastic pellets or powders, coke, lime, silica gel, powdered acid resins, rare earth powders and powdered alumina.

Pneumatic containers generally include one or more product compartments that are usually cylindrical or spherical in shape in order to facilitate unloading by a method which involves pressurizing the compartments. Cylindrical or spherical product compartments are also generally easy to completely empty. Each product compartment is provided with a discharge hopper that may be generally cylindrical or conical in shape. Each discharge hopper has a material outlet at the bottom and a valve which controls the entry of material into the outlet. An unloading system is also provided which includes a blower or other mechanism for pressurizing air or another gas. The blower provides the energy required for unloading the material from the container in the form of compressed air or another gas. One end of a pressurizing gas conduit is attached to the blower and the other end to a pressurizing gas inlet in the container. Operation of the blower will compress air or gas and move it through the pressurizing gas inlet into the container, thereby increasing the pressure of the air or gas above the material in the product compartments in the container in order to assist in discharging material through the hopper outlets. One end of a material conveying conduit is also attached to the blower and extends past and connects to each material outlet so that when the product compartment has been pressurized, air or another gas may be directed into the material conveying conduit to entrain material passing through each material outlet and carry it to the discharge end of the conduit.

Pneumatic containers are commonly mounted on a frame which includes the undercarriage of a trailer. The product compartments of the container are generally enclosed by a sheet metal sheath, and the container is supported by internal rings or fully circumferential external rings and longitudinal rails. Internal rings make it difficult to wash out the inside of the container, potentially trapping product in crevices adjacent to the rings. Such trapped product may harbor bacteria that could contaminate subsequent product loads. In addition, external rings and rails contribute to increased drag coefficient, thereby resulting in reduced fuel efficiency.

Advantages of the Invention

Among the advantages of the invention is that it provides a trailer-mounted container for particulate materials that is easy to clean. Another advantage of the invention is that it provides such a container that is more aerodynamic than conventional trailer-mounted containers. Still another advantage of the invention is that it provides such a container that is easier to construct and assemble than conventional trailer-mounted containers. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. The recitation of a range of values herein is merely intended to serve as a shorthand method of referring individually to each separate value falling within the recited range, unless otherwise indicated herein, and each separate value is incorporated into the specification as if it were individually recited herein.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless explicitly so stated.

Several terms are specifically defined herein. These terms are to be given their broadest possible construction consistent with such definitions, as follows:

The term "particulate material" refers to granular, fluent or comminuted material that is capable of being transported through a conduit by an entraining gas.

The terms "upper", "above", "top", and similar terms, when used in reference to a relative position or direction on or with respect to container mounted on a trailer, or a component or portion of such a container, refer to a relative position or direction that is farther away from the roadway on which the trailer is placed for operation.

The terms "lower", "below", and similar terms, when used in reference to a relative position or direction on or with respect to a container mounted on a trailer, or a component or portion of such a container, refer to a relative position or direction that is nearer the roadway on which the trailer is placed for operation.

The term "front" and similar terms, as used herein to describe a relative position or direction on or in connection with a container mounted on a trailer, or a component or portion of such a container, refer to a relative position or direction towards the tractor when the trailer is in use on a roadway.

The term "rear" and similar terms, as used herein to describe a relative position or direction on or in connection with a container mounted on a trailer, or a component or portion of such a container, refer to a relative position or direction away from the tractor when the trailer is in use on a roadway.

SUMMARY OF THE INVENTION

The invention comprises a container for particulate materials that is of a type which is adapted to be mounted on a trailer for transport on a roadway. The container comprises a plurality of hoppers which are spaced along the long axis of the container, a shell that is disposed over the plurality of hoppers, and an internal U-shaped divider plate between each pair of adjacent hoppers.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which:

FIG. 8 is an end view of a rear end cone assembly for the container shown in FIGS. 1-4.

FIG. 9 is a side view of the end cone assembly shown in FIG. 8.

DESCRIPTION OF THE PREFERRED EMBODIMENT OF THE INVENTION

Figure 1:
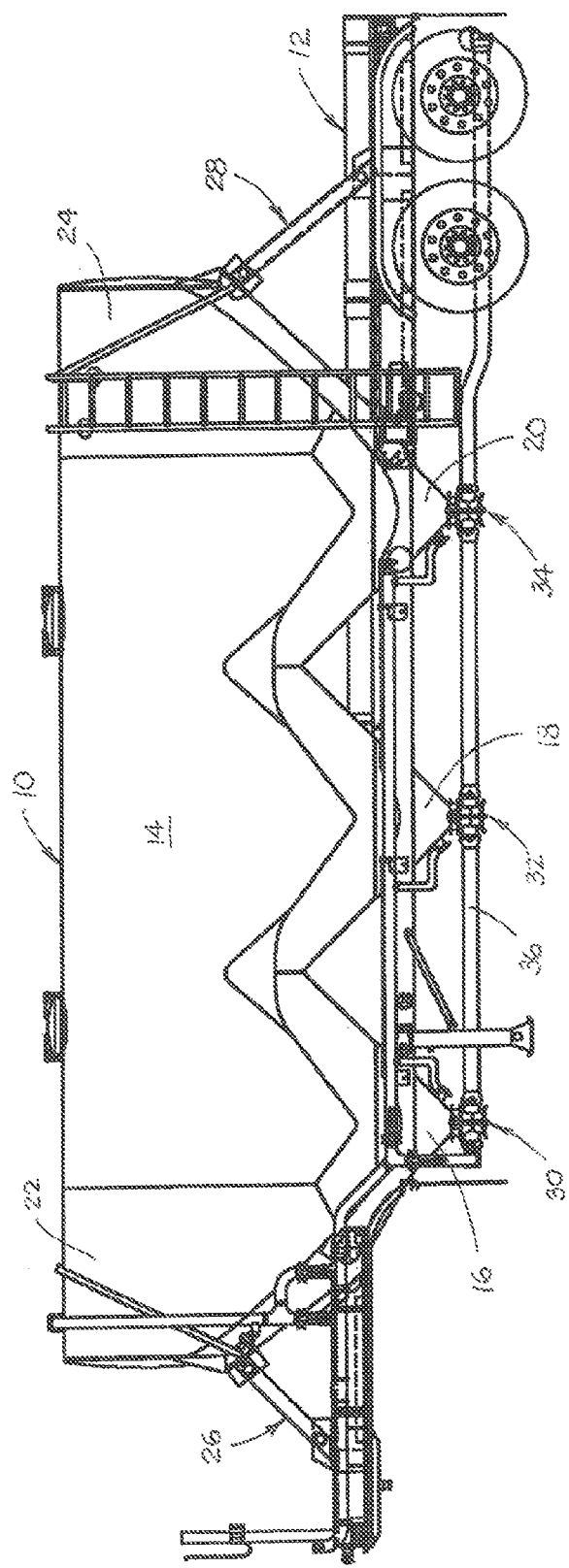
FIG. 1 is a side view of a preferred embodiment of a preferred embodiment of the container that comprises the invention, showing the container mounted on a trailer.
Figure 4:
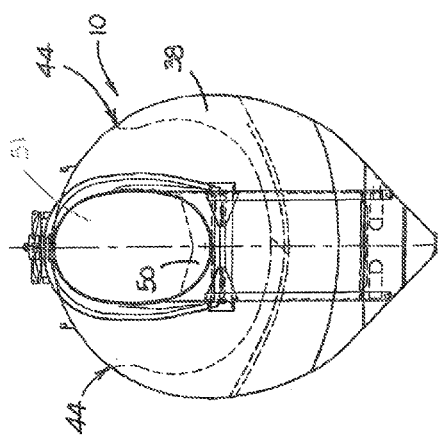
FIG. 4 is a rear view of the container shown in FIGS. 1-3.
Figure 3:
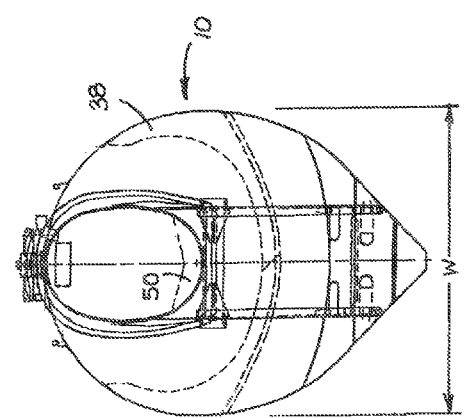
FIG. 3 is a front view of the container shown in FIGS. 1 and 2.
Figure 5:
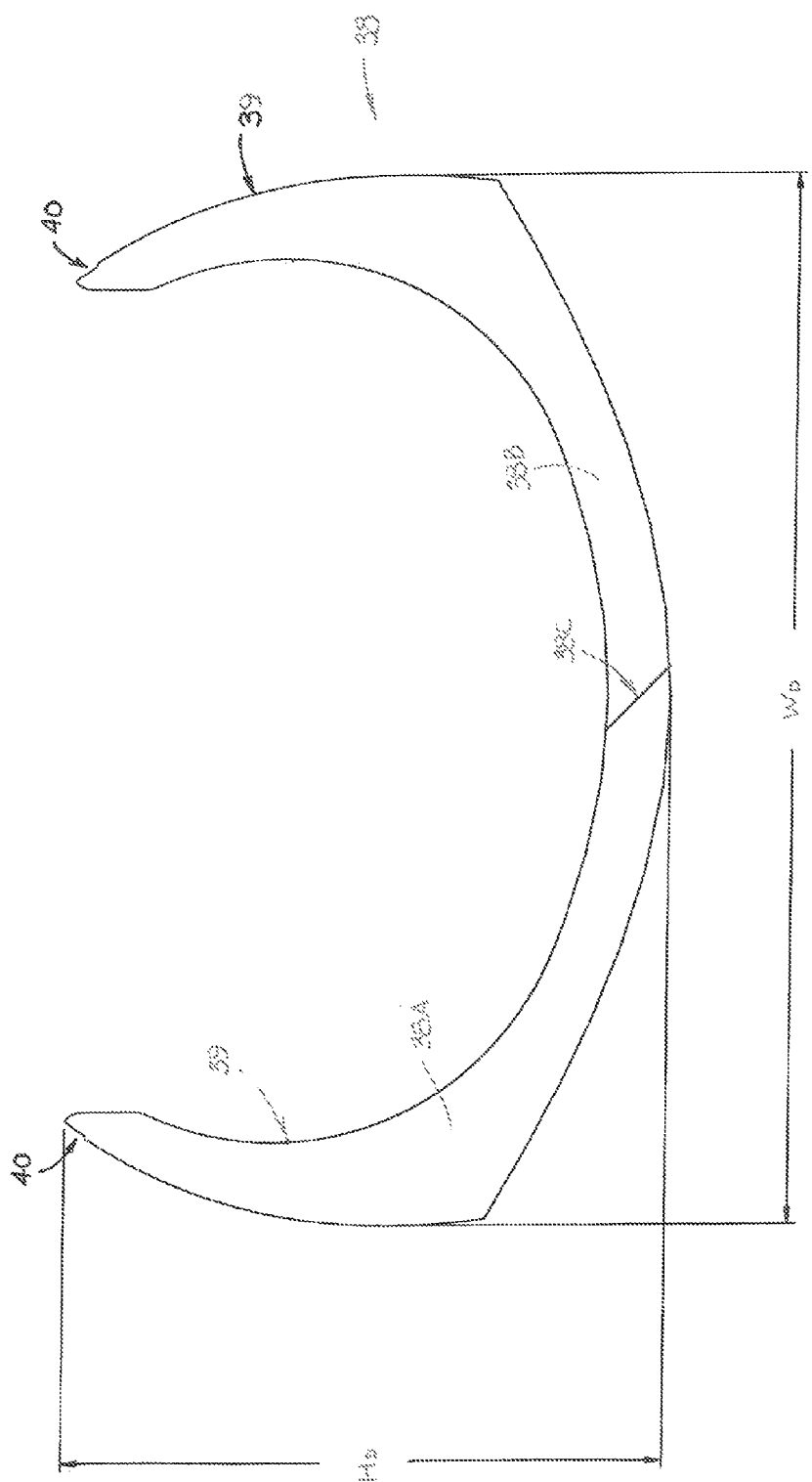
FIG. 5 is a front view of the preferred divider plate of the container shown in FIGS. 1-4.
Figure 6:
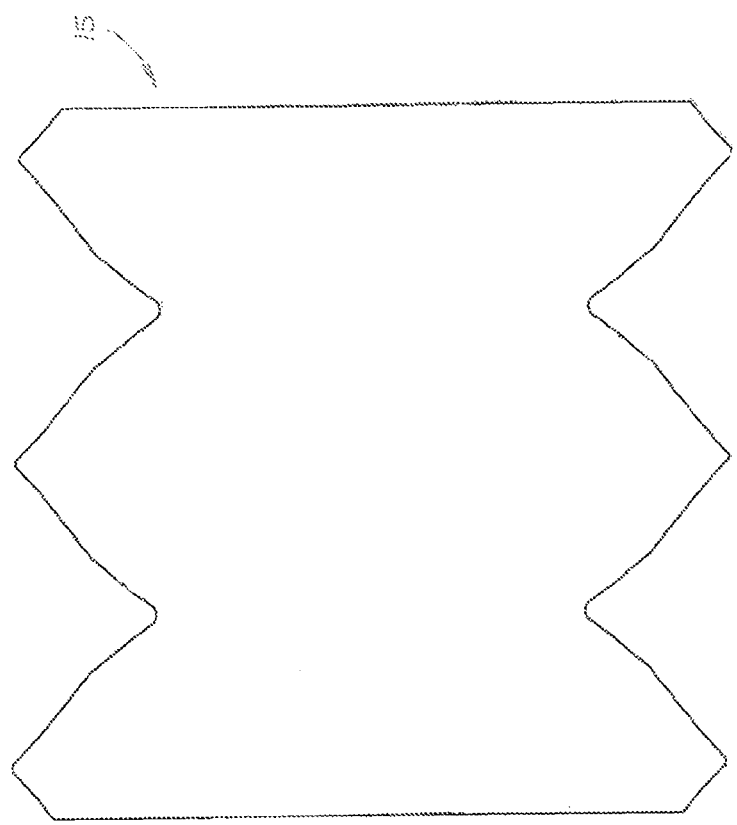
FIG. 6 is a top view of a preferred blank that is adapted to be formed into the shell of the container shown in FIGS. 1-4.
Figure 7:
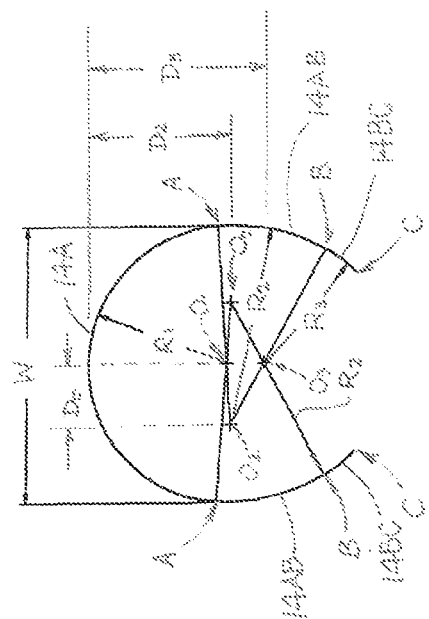
FIG. 7 is an end view of the blank of FIG. 6, after it has been formed into the shell of the container.

FIGS. 1-9 illustrate a preferred embodiment of the invention in the form of container 10 that is mounted on trailer 12 (not shown in FIGS. 2-9). Container 10 comprises shell 14 that is disposed over hoppers 16, 18 and 20 which are spaced along the long axis of the container. As viewed from an end, the container has a height to width ratio ("H" of FIG. 2 to "W" of FIGS. 3 and 7) that is within the range of 1.2/1 to 1.4/1, preferably about 1.3/1. Shell 14 is formed from blank 15, preferably of aluminum sheet, as shown in FIGS. 6 and 7. As shown in FIG. 7, upper portion 14A of shell 14 comprises an arc (between points "A" on opposite sides of shell 14) having constant radius $R_1$ (from upper origin $O_1$), which radius $R_1$ is one-half the length of container width "W". Preferably, upper portion 14A comprises an arc through an angular range (between points "A") of about 160° to about 180°, most preferably about 170°. Each intermediate portion 14AB, between points "A" and "B" on each side of shell 14 below upper portion 14A, comprises an arc of radius $R_2$ (from an intermediate origin $O_2$), which radius has a length that is greater than that of $R_1$ Preferably, $R_2$ has a length that is within the range of about $1.2R_1$ to about $1.25R_1$, and each intermediate origin $O_2$ is located a distance $D_2$ down from the top of shell 14 that is within the range of about $1.05R_1$ to about $1.15R_1$, preferably about $1.1R_1$.

Preferably, each intermediate portion 14AB comprises an arc through an angular range (between points "A" and "B") of about 30° to about 35°, most preferably about 33°. Each lower portion 14BC, between points "B" and "C" below intermediate portion 14AB on each side of shell 14 comprises an arc of radius $R_3$ (from common lower origin $O_3$), which radius has a length that is less than that of $R_1$. Preferably, $R_3$ has a length that is within the range of about $0.85 R_1$ to about $0.95 R_1$, and lower origin $O_3$ is located a distance $D_3$ down from the top of shell 14 that is within the range of about $1.25R_1$ to about $1.35R_1$, preferably about $1.30R_1$. Preferably, each lower portion 14BC comprises an arc through an angular range (between points "B" and "C" on each side of shell 14) of about 15° to about 20°, most preferably about 18°. It is also preferred that each of the two intermediate origins $O_2$ are located on opposite sides of a line passing through upper origin $O_1$ and common lower origin $O_3$ by a distance $D_O$ that is within the range of about $0.40R_1$ to about $0.46R_1$, preferably about $0.43R_1$. Together, upper portion 14A, each of the adjacent intermediate portions 14AB, and each of the lower portions 14BC comprise adjacent arcs of varying radii. A front end cone 22 and a rear end cone 24 are attached to shell 14 at the front and rear ends, respectively, of container 10. The front end cone and the rear end cone of preferred container 10 are essentially identical.

Referring again to FIG. 1, it can be seen that container 10 is supported on trailer 12 by front support 26 and rear support 28, but that there are no conventional internal supports in the container. Conventional material outlets 30, 32 and 34 are located at the bottom of each of hoppers 16, 18 and 20 respectively, and a conventional entrainment system 36 provides for pneumatic unloading of the container.

Preferred container 10 includes an internal U-shaped divider plate 38, preferably made of aluminum, which is located between adjacent hoppers and welded to the inside of shell 14. Preferably, as shown in FIG. 5, each U-shaped divider plate 38 is comprised of two components 38A and 38B that are welded together at joint 38C. It is also preferred that each U-shaped divider plate 38 have a height to width ratio ("$H_D$" to "$W_D$") that is within the range of about 0.50/1 to about 0.65/1, most preferably about 0.58/1. At the upper end of each arm 39 of U-shaped divider plate 38 is an indention 40 (best shown in FIG. 5) that is adapted to support a circular plate 42, preferably of aluminum and preferably of about 3 inches in diameter, that is welded or otherwise attached to the upper end of each arm 39 of divider plate 38 and to the inner surface of shell 14. Each circular plate 42 lays flat against the inner surface of the shell and the U-shaped divider plate, and provides for a generally smooth geometric transition between the circular plate and the adjacent upper end of arm 39 of U-shaped divider plate 38.

Figure 2:
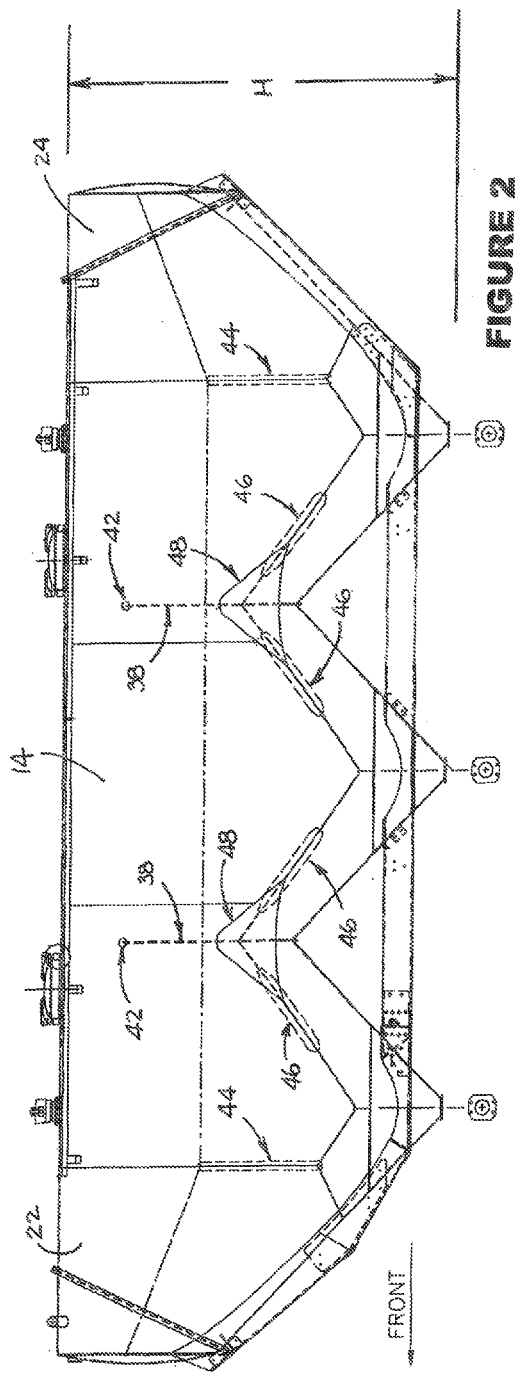
FIG. 2 is a side view of the preferred container shown in FIG. 1.

A plurality of reinforcement plates are welded or otherwise attached between the inside surface of shell 14 and each of the hoppers, and between the inside surface of each end cone and the adjacent hopper. Each reinforcement plate lays flat against the inner surface of the shell or the end cone, and provides for a generally smooth geometric transition between the adjacent components. Thus, as shown in FIG. 2, reinforcement plates 44 are located at the junctures of the end cones and the shell, and reinforcement plates 46 are located between the hoppers and the shell near each U-shaped divider. Furthermore, generally triangular external shell inserts 48 are placed outside the lower part of the shell at each U-shaped divider. In addition, reinforcement plates 50 are located in the heads of the end cones adjacent to the end plates. Thus, for example, reinforcement plate 50 is located inside of rear end cone 24, adjacent to end plate 51, as shown in FIG. 4. Each of the reinforcement plates and shell inserts is preferably formed of aluminum plate and is welded into place. Each reinforcement plate thus serves to provide a smooth inner surface that facilitates cleanout of the container and minimizes the chance of any product remaining in the container after an unloading cycle. The reinforcement plates and the shell inserts also serve to distribute stresses through the shell.

The configuration of shell 14, in combination with the U-shaped divider plates 38 between the hoppers and the reinforcement plates and the shell inserts, provides a container for particulate materials that is easy to clean, more aerodynamic than conventional trailer-mounted containers, and is easier to construct and assemble than conventional trailer-mounted containers.

Although this description contains many specifics, these should not be construed as limiting the scope of the invention but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A container for particulate materials that is adapted to be mounted on a trailer for transport on a roadway, said container having a long axis and further comprising:
    (a) a plurality of hoppers comprising at least one pair of adjacent hoppers which are spaced along the long axis of the container, with each such hopper having a material outlet that is separate from the material outlet of the adjacent hopper;
    (b) a shell that is disposed over the plurality of hoppers and adapted to enclose the container so that the container may be pressurized with a pressurizing gas in order to facilitate unloading of the particulate materials;
    (c) an internal U-shaped divider plate that is located between each pair of adjacent hoppers and not adjacent to any of the material outlets, wherein each U-shaped divider plate comprises a pair of arms, each of which has an upper end, and the upper ends of the pair of arms of each U-shaped divider plate are not joined together.

2. The container of claim 1 wherein the container has a height to width ratio within the range of 1.2/1 to 1.4/1.

3. The container of claim 1 wherein each U-shaped divider plate has a height to width ratio that is within the range of about 0.50/1 to about 0.65/1.

4. The container of claim 1 wherein each U-shaped divider plate has a height to width ratio of about 0.58/1.

5. A container for particulate materials that is adapted to be mounted on a trailer for transport on a roadway, said container having a long axis and further comprising:
    (a) a plurality of hoppers comprising at least one pair of adjacent hoppers which are spaced along the long axis of the container;
    (b) a shell that is disposed over the plurality of hoppers;
    (c) an internal U-shaped divider plate between each pair of adjacent hoppers, wherein each U-shaped divider plate comprises a pair of arms, each of which has an upper end, and wherein:
        (i) the upper ends of the pair of arms of each U-shaped divider plate are not joined together;
        (ii) the upper end of each arm of each U-shaped divider plate includes an indention;
    (d) a pair of support plates that are associated with each U-shaped divider plate, with each such support plate being attached to the indention in one of the upper ends of an arm of the U-shaped divider plate and to an inner surface of the shell.

6. A container for particulate materials that is adapted to be mounted on a trailer for transport on a roadway, said container having a long axis and further comprising:
    (a) a plurality of hoppers comprising at least one pair of adjacent hoppers which are spaced along the long axis of the container;
    (b) a shell that is disposed over the plurality of hoppers, said shell comprising:
        (i) an upper portion comprising an arc of constant radius;
        (ii) a pair of intermediate portions, each comprising an arc having a radius that is greater in length than the radius of the arc of the upper portion;
        (iii) a pair of lower portions, each comprising an arc having a radius that is less in length than the radius of the arc of the upper portion;
    (c) an internal U-shaped divider plate between each pair of adjacent hoppers, wherein each U-shaped divider plate comprises a pair of arms, each of which has an upper end, and the upper ends of the pair of arms of each U-shaped divider plate are not joined together.

7. The container of claim 6, wherein:
    (a) the upper portion comprises an arc having a radius from an upper origin;
    (b) each of the intermediate portions comprises an arc having a radius from an intermediate origin;
    (c) each of the lower portions comprises an arc having a radius from a common lower origin;
    (d) the intermediate origins are located on opposite sides of a line passing through the upper origin and the common lower origin by a distance that is within the range of about 0.40 to about 0.46 times the length of the radius of the upper portion.

8. The container of claim 6, wherein:
    (a) the upper portion of the shell comprises an arc through an angular range of about 160° to about 180°;
    (b) the intermediate portions of the shell each comprise an arc through an angular range of about 30° to about 35°;
    (c) the lower portions of the shell each comprise an arc through an angular range of about 15° to about 20°.

9. The container of claim 6, wherein:
(a) the upper portion of the shell comprises an arc through an angular range of about 170°;
(b) the intermediate portions of the shell each comprise an arc through an angular range of about 33°;
(c) the lower portions of the shell each comprise an arc through an angular range of about 18°.

10. The container of claim 6, wherein each of the intermediate portions comprises an arc having a radius from an intermediate origin with a length that is within the range of about 1.2 to about 1.25 times the length of the radius of the upper portion.

11. The container of claim 10, wherein each of the intermediate origins is located a distance from the top of the shell that is within the range of about 1.05 to about 1.15 times the length of the radius of the upper portion.

12. The container of claim 6, wherein each of the lower portions comprises an arc having a radius from a common lower origin having a length that is within the range of about 0.85 to about 0.95 times the length of the radius of the upper portion.

13. The container of claim 12, wherein the lower origin is located a distance from the top of the shell that is within the range of about 1.25 to about 1.35 times the length of the radius of the upper portion.

14. The container of claim 6 which includes a generally triangular shell insert located outside the shell and adjacent to each U-shaped divider plate.

15. The container of claim 14 which includes an elongated reinforcement plate between each hopper and the shell, and each such elongated reinforcement plate lays flat against an inner surface of the shell.

16. The container of claim 1:
(a) wherein the shell has a front end and a rear end;
(b) which includes a front end cone that is attached to the front end of the shell and a rear end cone that is attached to the rear end of the shell.

17. The container of claim 16:
(a) wherein the front end of the shell has an inside surface;
(b) wherein the rear end of the shell has an inside surface;
(b) wherein the front end cone has an inside surface that is adjacent to the inside surface of the front end of the shell;
(c) wherein the rear end cone has an inside surface that is adjacent to the inside surface of the rear end of the shell;
(d) which includes a front reinforcement plate that is attached to the inside surface of the front end of the shell and to the adjacent inside surface of the front end cone and a rear reinforcement plate that is attached to the inside surface of the rear end of the shell and to the adjacent inside surface of the rear end cone, wherein each reinforcement plate lays flat against the inside surface of the shell or the inside surface of the end cone with which it is associated and provides for a generally smooth geometric transition between the adjacent inside surfaces.

18. The container of claim 16 wherein each end cone includes an end plate and a reinforcement plate that is located inside the end cone and adjacent to the end plate with which it is associated.

* * * * *